United States Patent
Wu et al.

(10) Patent No.: US 8,650,449 B2
(45) Date of Patent: Feb. 11, 2014

(54) ENCODER, DECODER, ENCODING METHOD, AND DECODING METHOD

(75) Inventors: Jianming Wu, Kawasaki (JP); Tomohiko Taniguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 65 days.

(21) Appl. No.: 12/962,909

(22) Filed: Dec. 8, 2010

(65) Prior Publication Data
US 2011/0078529 A1 Mar. 31, 2011

Related U.S. Application Data

(63) Continuation of application No. PCT/JP2008/062102, filed on Jul. 3, 2008.

(51) Int. Cl.
*G08C 25/02* (2006.01)

(52) U.S. Cl.
USPC ............ 714/748; 714/749; 714/750; 714/751

(58) Field of Classification Search
None
See application file for complete search history.

(56) References Cited

U.S. PATENT DOCUMENTS

| | | | |
|---|---|---|---|
| 6,161,207 A | 12/2000 | Lockhart et al. | |
| 7,043,210 B2 | 5/2006 | Zhu et al. | |
| 2004/0117722 A1 | 6/2004 | Harada | |
| 2007/0253423 A1 | 11/2007 | Chindapol et al. | |
| 2009/0089641 A1* | 4/2009 | Schedelbeck et al. | 714/748 |
| 2009/0279631 A1 | 11/2009 | Chen et al. | |
| 2010/0115360 A1* | 5/2010 | Seok et al. | 714/748 |
| 2011/0246846 A1* | 10/2011 | Ojala et al. | 714/748 |

FOREIGN PATENT DOCUMENTS

| | | |
|---|---|---|
| EP | 2 178 239 | 4/2010 |
| JP | 10-210079 | 8/1998 |
| JP | 2000-224226 | 8/2000 |
| JP | 2001-197044 | 7/2001 |
| JP | 2004-180074 | 6/2004 |
| JP | 2004-533777 | 11/2004 |
| JP | 2006-245912 | 9/2006 |
| JP | 2007-006231 | 1/2007 |
| JP | 2007-116411 | 5/2007 |

OTHER PUBLICATIONS

International Search Report issued for corresponding International Patent Application No. PCT/JP2008/062102, mailed Sep. 16, 2008.

(Continued)

*Primary Examiner* — Albert Decady
*Assistant Examiner* — Justin R Knapp
(74) *Attorney, Agent, or Firm* — Myers Wolin, LLC (57) ABSTRACT

A new-part acquiring unit acquires a part of a block generated by a block generating unit, as a new part to be contained in a packet. A retransmission-part acquiring unit acquires a part of a block corresponding to a NAK as a retransmission part to be contained in a packet among blocks held in a retransmission buffer unit. An encoding unit groups a new part acquired by the new-part acquiring unit and a retransmission part acquired by the retransmission-part acquiring unit, and generates a packet. A modulating unit modulates a packet output from the encoding unit. A wireless processing unit performs a predetermined wireless transmission process to a modulated packet, and transmits a processed modulated packet via an antenna.

7 Claims, 10 Drawing Sheets

(56) References Cited

OTHER PUBLICATIONS

3GPP TR 25.848 V4.0.0; 3rd Generation Partnership Project; Technical Specification Group Radio Access Network; "Physical layer aspects of UTRA High Speed Downlink Packet Access" (Release 4); Dated Mar. 2001.

Tao Shi et al.; "Combining techniques and segment selective repeat on turbo coded hybrid ARQ" in Proc. IEEE Conf. WCNC.2004 IEEE; vol. 4, pp. 2115-2119; Dated Mar. 21-25, 2004.

J. Wu and Jun Li; "Non-Complete Puncture Based Re-transmission for HARQ"; 3GPP2 TSG-C Working Group 5; C50-20011105-025; Source: Nortel Networks, Nepean, ON, Canada and Richardson, TX, USA; Dated Nov. 5, 2001.

Non-Final Office Action issued by the United States Patent and Trademark Office for corresponding U.S. Appl. No. 13/625,224, mailed Dec. 21, 2012.

Notice of Rejection Office Action issued for corresponding Japanese Patent Application No. 2010-518859 mailed Jul. 10, 2012 with English translation.

The extended European search report, including the supplementary European search report and the European search opinion, issued for corresponding European Patent Application No. 08790846.3, dated Nov. 18, 2013.

\* cited by examiner

ENCODER, DECODER, ENCODING METHOD, AND DECODING METHOD

CROSS-REFERENCE TO RELATED APPLICATIONS

This application is a continuation of International Application No. PCT/JP2008/062102, filed on Jul. 3, 2008, the entire contents of which are incorporated herein by reference.

FIELD

The embodiments discussed herein are directed to an encoder, a decoder, an encoding method, and a decoding method.

BACKGROUND

Generally, in wireless communications, because an error sometimes occurs in a packet being transmitted through a transmission path for transmitting a packet, a technique of retransmitting from a transmitting device to a receiving device a packet in which an error occurred has been widely known. As a specific retransmission technique, there is an HARQ (Hybrid Automatic Repeat reQuest), for example. The HARQ is further divided into types such as CC (Chase Combining)-HARQ and IR (Increment Redundancy)-HARQ.

In the CC-HARQ, a transmitting device retransmits the same packet as that transmitted first, and a receiving device combines a first-received packet with a retransmitted packet, and performs decoding on the whole combined signal. Therefore, an SNR (Signal to Noise Ratio) cumulatively increases, and mutual information increases by the transmission of the packet. As a result, the precision of decoding in the receiving device improves, and thus errors of a packet can be reduced.

On the other hand, in the IR-HARQ, a transmitting device retransmits a packet containing a redundant bit different from that of a first-transmitted packet, and a receiving device performs decoding by using the redundant bits contained in a first-received packet and in the retransmitted packet, respectively. Therefore, redundant bits used for the decoding increase, an SNR cumulatively increases, and then mutual information increases. As a result, the precision of decoding in the receiving device improves, and thus errors of a packet can be reduced.

Further, with regard to these HARQs, there has been studied a technique in which a receiving device calculates a likelihood concerning each part of a packet, and when packet retransmission is necessary, a part having a calculated low likelihood is selected and retransmitted, and thus of a part having a high possibility of an error is retransmitted with priority.

However, when the HARQ is performed, a packet once transmitted is always retransmitted. Therefore, as compared with a case that there is no packet to be retransmitted, transmission of a packet containing a new information bit is delayed, and thus there is a limit in improving throughput. That is, when a transmitting device receives a NAK indicating that there is an error in a packet received by a receiving device, the transmitting device retransmits an already received packet prior to a packet containing a new information bit. Therefore, transmission of the packet containing a new information bit is delayed, and there is a limit in improvement of throughput.

Retransmission of a packet of the HARQ also has a problem that resources more than necessary are used to cancel a packet error. For example, in a relationship between an SNR and mutual information illustrated in FIG. 1, it is assumed that the mutual information needs to be equal to or larger than a threshold value Th for a receiving device to cancel an error of a packet by decoding. In this case, when an SNR of only a first-received packet is a (dB), the mutual information does not reach the threshold value Th, and therefore retransmission of a packet is requested to a transmitting device.

Figure 1:
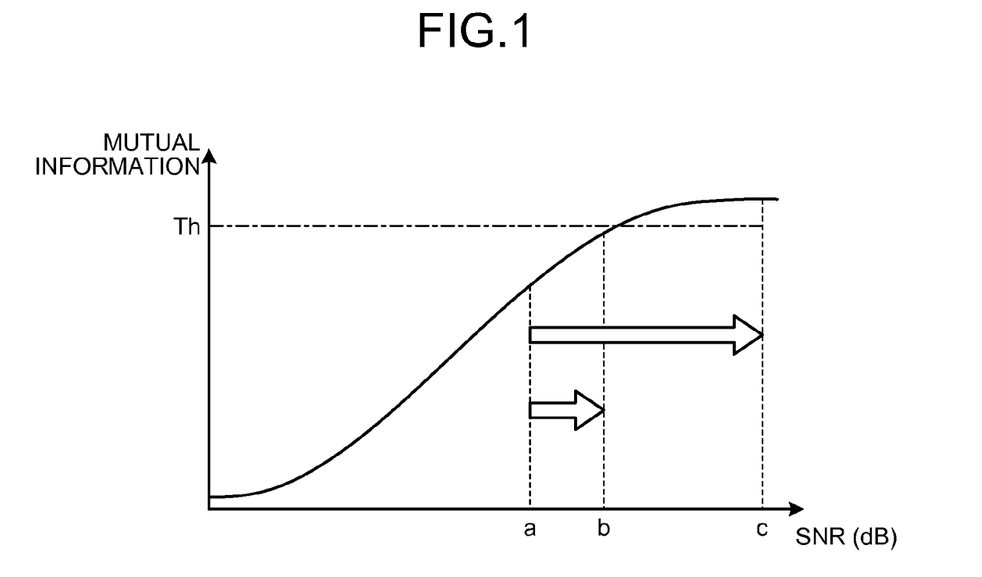
FIG. 1 depicts a relationship between an SNR and mutual information.

When packet retransmission is requested, the transmitting device retransmits an already transmitted packet, and therefore a cumulative SNR in the receiving device increases to c (dB). Because the mutual information exceeds the threshold value Th at this time, an error of the packet is cancelled by the retransmission. However, in practice, when an SNR becomes b (dB), the mutual information becomes equal to the threshold value Th, and therefore resources to change the SNR from b (dB) to c (dB) are used wastefully. In other words, energy is excessively consumed by the packet retransmission.

Patent Document Japanese Laid-open Patent Publication No. 2006-245912

SUMMARY

According to an aspect of an embodiment of the invention, an encoder includes an acquiring unit that acquires a new part corresponding to an information bit not yet transmitted and a retransmission part corresponding to an information bit transmitted in past; an encoding unit that groups and encodes the new part and the retransmission part acquired by the acquiring unit; and a transmitting unit that transmits a packet obtained by encoding by the encoding unit.

According to another aspect of an embodiment of the invention, a decoder includes a receiving unit that receives a packet containing a new part corresponding to an information bit not yet received and a retransmission part corresponding to an information bit received in past; a combining unit that combines a part of a previously received packet corresponding to the retransmission part with the packet received by the receiving unit; and a new-part decoding unit that decodes the combined packet combined and obtained by the combining unit, and obtains a decoded result of the new part.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of the present invention will be explained with reference to accompanying drawings. While an application of the present invention to a CC-HARQ is mainly explained below, the present invention can be also similarly applied to an IR-HARQ.

Figure 2:
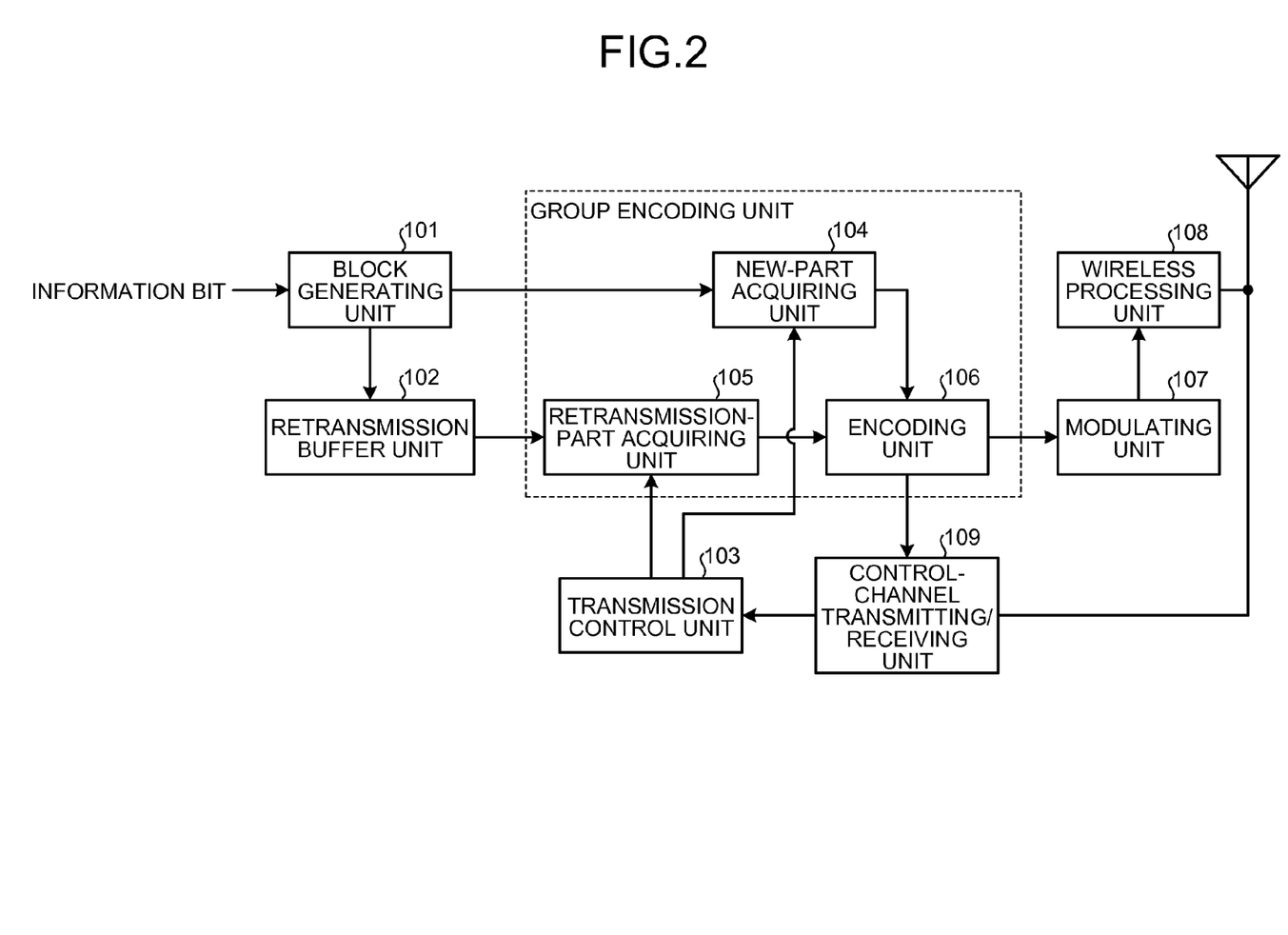
FIG. 2 is a block diagram of a configuration of relevant parts of a transmitting device according to an embodiment.

FIG. 2 is a block diagram of a configuration of relevant parts of a transmitting device including an encoder according to an embodiment of the present invention. The transmitting device illustrated in FIG. 2 has a block generating unit 101, a retransmission buffer unit 102, a transmission control unit 103, a new-part acquiring unit 104, a retransmission-part acquiring unit 105, an encoding unit 106, a modulating unit 107, a wireless processing unit 108, and a control-channel transmitting/receiving unit 109.

The block generating unit 101 generates a block of a predetermined size from an information bit to be transmitted to a receiving device described later. A size of the block generated by the block generating unit 101 is equal to an amount of an information bit that can be stored in one packet. That is, a normal packet transmitted by the transmitting device contains an information bit corresponding to one block. The block generating unit 101 causes the retransmission buffer unit 102 to hold a generated block to prepare for retransmission.

The retransmission buffer unit 102 temporarily holds a block of an information bit generated by the block generating unit 101 to prepare for retransmission. The retransmission buffer unit 102 can sequentially discard a block which has been accurately decoded and is not necessary to be retransmitted.

The transmission control unit 103 notifies the new-part acquiring unit 104 and the retransmission-part acquiring unit 105 of a new part and a retransmission part, respectively contained in a packet to be newly transmitted, corresponding to a received control signal via a control channel. Specifically, when the number of received NAKs is smaller than a predetermined number, the transmission control unit 103 instructs the new-part acquiring unit 104 and the retransmission-part acquiring unit 105 to transmit a new block generated by the block generating unit 101. On the other hand, when the number of received NAKs reaches a predetermined number, the transmission control unit 103 instructs the new-part acquiring unit 104 and the retransmission-part acquiring unit 105 to transmit a part of a transmitted block held by the retransmission buffer unit 102 together with a part of a new block.

The ACK and NAK transmitted and received via the control channel indicate whether there is an error in a block in the receiving device. The ACK and NAK are transmitted from the receiving device for each block. A block corresponding to a NAK indicating that there is an error in the block in the receiving device needs to be retransmitted. Therefore, when the NAK is received for a predetermined number of blocks, a part of blocks corresponding to each NAK is grouped with a part of a new block, and this group is retransmitted.

When the number of received NAKs is smaller than a predetermined number, the new-part acquiring unit 104 acquires the whole block generated by the block generating unit 101, as a new part to be contained in a packet, following an instruction from the transmission control unit 103. When the number of received NAKs reaches a predetermined number, the new-part acquiring unit 104 acquires a part of the block generated by the block generating unit 101, as a new part to be contained in a packet.

When the number of received NAKs is smaller than a predetermined number, the retransmission-part acquiring unit 105 does not acquire a block held in the retransmission buffer unit 102, as a retransmission part to be contained in a packet, following an instruction from the transmission control unit 103, because this is not a timing to retransmit an already transmitted block. When the number of received NAKs reaches a predetermined number, the retransmission-part acquiring unit 105 acquires a part of a block corresponding to the NAK, as a retransmission part to be contained in a packet, among blocks held in the retransmission buffer unit 102.

The encoding unit 106 groups a new part acquired by the new-part acquiring unit 104 and a retransmission part acquired by the retransmission-part acquiring unit 105, encodes the group, and generates a packet. Specifically, when the number of received NAKs is smaller than a predetermined number, the encoding unit 106 adds a redundant bit such as a CRC (Cyclic Redundancy Check) to the whole new block acquired by the new-part acquiring unit 104, and outputs an acquired packet to the modulating unit 107.

Figure 3:
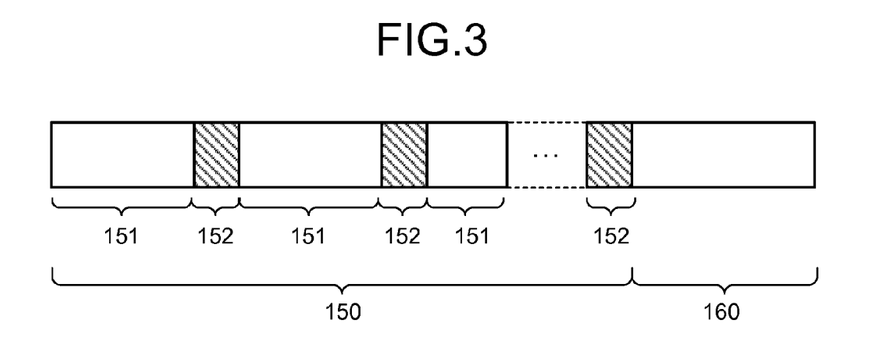
FIG. 3 is an example of a packet format according to the embodiment.

When the number of received NAKs reaches a predetermined number, the encoding unit 106 groups a part of a new block and a part of an already transmitted block, adds a redundant bit to the group, encodes the group, and outputs an acquired packet to the modulating unit 107. In this case, the encoding unit 106 generates a packet of a format as illustrated in FIG. 3, for example. The packet illustrated in FIG. 3 has an information data part 150 and a redundant data part 160. The information data part 150 has new parts 151 and retransmission parts 152. Each of the new parts 151 corresponds to a part of a new block acquired by the new-part acquiring unit 104, and each retransmission part 152 corresponds to a part of an already transmitted block acquired by the retransmission-part acquiring unit 105. The redundant data part 160 is added to the whole of the information data part 150 having the new parts 151 and the retransmission parts 152 as a group.

The encoding unit 106 notifies the control-channel transmitting/receiving unit 109 about whether a generated packet is a packet containing only a new block or a block containing both a new part and a retransmission part. The encoding unit 106 can be also arranged to generate a packet containing only a retransmission part when a new block is not generated by the block generating unit 101. In this case, the encoding unit 106 notifies the control-channel transmitting/receiving unit 109 that a generated packet is the one containing only a retransmission part.

The new-part acquiring unit 104, the retransmission-part acquiring unit 105, and the encoding unit 106 constitute a group encoding unit that groups a part of an already transmitted block and a part of a newly generated block, and encoding the group, when the number of received NAKs reaches a predetermined number.

The modulating unit 107 modulates a packet output from the encoding unit 106, and outputs a modulated packet to the wireless processing unit 108. The wireless processing unit 108 performs a predetermined wireless transmission process (such as D/A conversion) on the modulated packet, and transmits this packet via an antenna.

The control-channel transmitting/receiving unit 109 receives an ACK and a NAK from the receiving device via the control channel. The control-channel transmitting/receiving unit 109 also transmits a control signal indicating that a packet is not grouped, when a packet containing only a new block is generated by the encoding unit 106. Meanwhile, the control-channel transmitting/receiving unit 109 transmits a control signal indicating that a packet is grouped, when a packet containing both a new part and a retransmission part is generated by the encoding unit 106. The control-channel transmitting/receiving unit 109 transmits a control signal indicating that a packet is not grouped, in a similar manner to that when a packet containing only a new block is generated, when a packet containing only a retransmission part is generated by the encoding unit 106.

Figure 4:
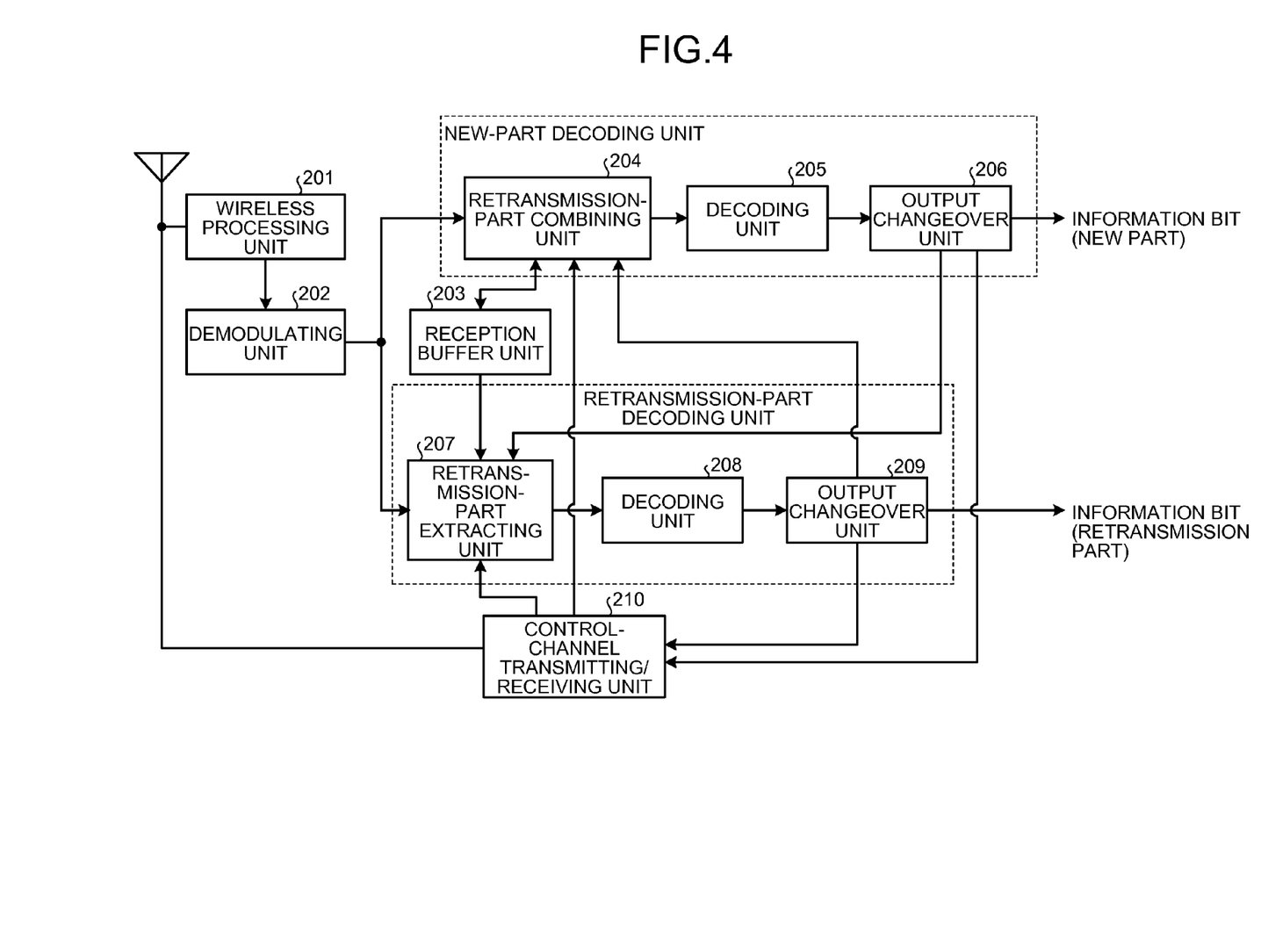
FIG. 4 is a block diagram of a configuration of relevant parts of a receiving device according to the embodiment.

FIG. 4 is a block diagram of a configuration of relevant parts of a receiving device including a decoder according to the present embodiment. The receiving device illustrated in FIG. 4 includes a wireless processing unit 201, a demodulating unit 202, a reception buffer unit 203, a retransmission-part combining unit 204, a decoding unit 205, an output changeover unit 206, a retransmission-part extracting unit 207, a decoding unit 208, an output changeover unit 209, and a control-channel transmitting/receiving unit 210.

The wireless processing unit 201 receives a packet via the antenna, and performs a predetermined wireless reception process (such as ND conversion) on a received packet. The demodulating unit 202 demodulates a received packet, and outputs the demodulated received packet to the retransmission-part combining unit 204 and to the retransmission-part extracting unit 207.

The reception buffer unit 203 temporarily holds a received packet to prepare for combining with a packet to be received in the future. When a received packet is input to the retransmission-part combining unit 204, the reception buffer unit 203 outputs a packet corresponding to a retransmission part contained in the received packet to the retransmission-part combining unit 204. Similarly, when a received packet is input to the retransmission-part extracting unit 207, the reception buffer unit 203 outputs a packet corresponding to a retransmission part contained in the received packet to the retransmission-part extracting unit 207.

The retransmission-part combining unit 204 refers to a control signal received by the control-channel transmitting/receiving unit 210, and combines a retransmission part contained in a received packet with a part of a previously received packet output from the reception buffer unit 203. Specifically, the retransmission-part combining unit 204 refers to a control signal, and determines whether a received packet is a grouped packet. When a received packet is not grouped, the retransmission-part combining unit 204 outputs the received packet straight to the decoding unit 205 because the received packet does not contain a retransmission part.

On the other hand, when a received packet is grouped, the retransmission-part combining unit 204 combines a previously received packet or an information bit output from the output changeover unit 209 with a new received packet. Specifically, at a first decoding time, the retransmission-part combining unit 204 acquires a part of a previously received packet corresponding to a retransmission part contained in a new received packet, and combines this part with the new received packet. With this arrangement, the retransmission-part combining unit 204 generates a combined packet by combining information of a previously received packet with a retransmission part contained in the new received packet.

As described above, the transmitting device also transmits a control signal indicating that a received packet is not grouped when the received packet contains only a retransmission part. Therefore, the retransmission-part combining unit 204 can be also arranged to search the reception buffer unit 203 and confirm whether a retransmission part contained in a new received packet holds a corresponding packet, when it is determined that a received packet is not grouped.

The retransmission-part combining unit 204 combines a decoded result of a retransmission part of a received packet output from the output changeover unit 209, with the received packet, at second and subsequent decoding times. Consequently, the retransmission-part combining unit 204 generates a combined packet by combining a decoded result of a retransmission part with the retransmission part contained in a new received packet. In this case, a decoded result of a retransmission part combined with a new received packet has a higher precision than that of information of a previously received packet combined at the last decoding time or that of a decoded result of a retransmission part. Therefore, a combined packet generated anew is decoded more accurately. The retransmission-part combining unit 204 outputs a generated combined packet to the decoding unit 205 at a first decoding time and at second and subsequent decoding times, respectively.

The decoding unit 205 decodes a received packet or a combined packet output from the retransmission-part combining unit 204. That is, when a received packet is output from the retransmission-part combining unit 204, the decoding unit 205 decodes the received packet by using a redundant data part of the received packet. Because this received packet does not contain a retransmission part, a decoded result contains only an information bit of a new block.

When a combined packet is output from the retransmission-part combining unit 204, the decoding unit 205 decodes the combined packet by using not only a redundant data part of a new received packet but also a decoded result of a part of a previously received packet or a retransmission part of the new received packet. The decoding unit 205 outputs a decoded result corresponding to a new part of a received packet to the output changeover unit 206. Because the decoding unit 205 decodes by using a decoded result of a part of a previously received packet or a retransmission part of a new received packet, a decoded result of a higher precision than that when decoding a received packet by itself can be obtained.

The output changeover unit 206 calculates an error rate from a result of decoding by the decoding unit 205, and outputs a decoded result of a new part to only the retransmission-part extracting unit 207, when a calculated error rate is equal to or higher than a predetermined threshold value and also when the number of times of repeating decoding is smaller than a predetermined number of times. When an error rate is lower than the predetermined threshold value, the output changeover unit 206 outputs a decoded result of a new part to the retransmission-part extracting unit 207 and also outputs the decoded result to a processing unit at a later stage (not illustrated) as an information bit of the new part. When an error rate is equal to or higher than the predetermined threshold value and also when the number of times of repeating decoding reaches the predetermined number of times, the output changeover unit 206 outputs a decoded result of a new part to the retransmission-part extracting unit 207 and also notifies the control-channel transmitting/receiving unit 210 that retransmission of a new part is necessary.

The retransmission-part combining unit 204, the decoding unit 205, and the output changeover unit 206 constitute a new-part decoding unit that decodes a new part contained in a received packet.

The retransmission-part extracting unit 207 refers to a control signal received by the control-channel transmitting/receiving unit 210, extracts a retransmission part contained in a received packet by using a decoded result of a new part of the received packet, and combines an extracted retransmission part with a previously received packet. Specifically, the retransmission-part extracting unit 207 refers to a control signal indicating whether a received packet is a grouped packet. When the received packet is a grouped packet, the retransmission-part extracting unit 207 extracts a retransmission part by using a decoded result of a new part output from the output changeover unit 206. The retransmission-part extracting unit 207 acquires a previously received packet corresponding to an extracted retransmission part from the reception buffer unit 203, and combines the extracted retransmission part with the previously received packet. Consequently, the retransmission-part extracting unit 207 generates a combined packet by combining a retransmission part of a new received packet with the previously received packet. A new received packet has a possibility of containing a retransmission part concerning plural previously received packets. In this case, the retransmission-part extracting unit 207 combines corresponding retransmission parts with respective previously received packets.

Each time when the output changeover unit 206 outputs a decoded result of a new part, the retransmission-part extracting unit 207 repeatedly extracts a retransmission part from a new received packet, and generates a combined packet by combining a more accurate retransmission part than that at the last decoding time with a previously received packet. That is, because retransmission parts extracted at second and subsequent decoding times are extracted by using a decoded result of a new part of a higher precision than that at the last decoding time, the retransmission parts have a higher precision than that of a retransmission part extracted at the last decoding time.

The decoding unit 208 decodes a combined packet output from the retransmission-part extracting unit 207. That is, the decoding unit 208 decodes a combined packet by using a previously received packet having an error and a retransmission part of a new received packet. The decoding unit 208 outputs a decoded result of the combined packet to the output changeover unit 209. Because the decoding unit 208 decodes by using accurate information of a retransmission part extracted by using a decoded result of a new part, a decoded result of a higher precision than that when decoding by simply combining a retransmission part of a received packet with a previously received packet can be obtained.

The output changeover unit 209 calculates an error rate from a result of decoding by the decoding unit 208, and outputs a decoded result corresponding to a retransmission part in a combined packet to only the retransmission-part combining unit 204, when a calculated error rate is equal to or higher than the predetermined threshold value and also when the number of times of repeating decoding is smaller than a predetermined number of times. When an error rate is lower than the predetermined threshold value, the output changeover unit 209 outputs a decoded result of a combined packet to a processing unit at a later stage (not illustrated). When an error rate is equal to or higher than the predetermined threshold value and also when the number of times of repeating decoding reaches the predetermined number of times, the output changeover unit 209 notifies the control-channel transmitting/receiving unit 210 that further retransmission of a block corresponding to a retransmission part is necessary.

The retransmission-part extracting unit 207, the decoding unit 208, and the output changeover unit 209 constitute a retransmission-part decoding unit that decodes a retransmission part contained in a received packet.

The control-channel transmitting/receiving unit 210 receives a control signal indicating whether a packet is grouped, from the control device via the control channel. The control-channel transmitting/receiving unit 210 also transmits an ACK and a NAK corresponding to the necessity of retransmission notified from the output changeover unit 206 and the output changeover unit 209. At this time, the control-channel transmitting/receiving unit 210 identifies each block contained in a received packet, transmits an ACK concerning a block not requiring retransmission because an error rate is lower than the predetermined threshold value, and transmits a NAK concerning a block requiring retransmission because an error rate is equal to or higher than the predetermined threshold value.

The control-channel transmitting/receiving unit 210 can be also arranged to transmit ACK/NAK for plural received packets without transmitting ACK/NAK for each received packet. That is, the control-channel transmitting/receiving unit 210 can be arranged to transmit ACK/NAK of each block contained in a received packet after plural packets continuously received by the receiving device are decoded. Consequently, control signals can be reduced when two continuous packets contain a retransmission part concerning the same block.

The control channel used by the control-channel transmitting/receiving unit 109 of the transmitting device and by the control-channel transmitting/receiving unit 210 of the receiving device is configured by (N+2) bits when the number of blocks retransmitted by one packet is N. A first bit of the control channel is ACK/NAK concerning a new part of a received packet in the receiving device, and is transmitted from the control-channel transmitting/receiving unit 210 to the control-channel transmitting/receiving unit 109. Therefore, the first bit of the control channel is used to notify presence of retransmission of a new part of a normal packet not grouped or a grouped packet.

A second bit to an (N+1)-th bit of the control channel are ACK/NAK concerning a retransmission part of a received packet in the receiving device, and are transmitted from the control-channel transmitting/receiving unit 210 to the control-channel transmitting/receiving unit 109. Therefore, these bits are separately provided for each block, and are used to notify presence of retransmission of each block contained in a retransmission part of a grouped packet.

An (N+2)-th bit of the control channel is a signal indicating whether a packet is a normal packet or a grouped packet, and is transmitted from the control-channel transmitting/receiving unit 109 to the control-channel transmitting/receiving unit 210. There are two kinds of packets as a normal packet, including a packet containing only a new part and a packet containing only a retransmission part. When a received packet can be determined as a normal packet, the receiving device can determine whether a new packet is a retransmitted packet depending on whether the same packet is held in the reception buffer unit 203.

Next, with reference to FIGS. 5 to 9, operations of the transmitting device and the receiving device configured as described above are explained with specific examples.

Figure 5:
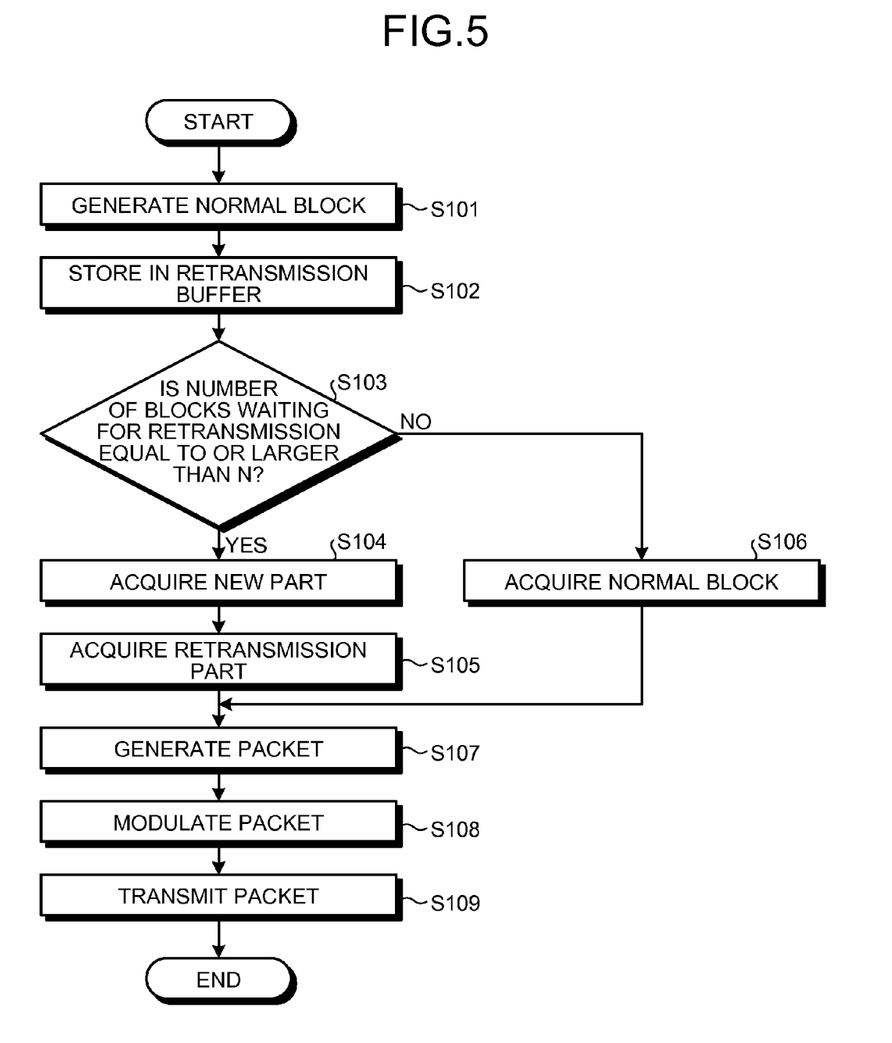
FIG. 5 is a flowchart of an operation of the transmitting device according to the embodiment.

FIG. 5 is a flowchart of an operation of the transmitting device according to the present embodiment. In FIG. 5, transmission and reception of a control signal via a control channel are omitted, and a process concerning packet transmission is illustrated.

First, an information bit to be transmitted to the receiving device is input to the block generating unit 101, and a block (hereinafter, "normal block") of a predetermined size containing the information bit is generated (Step S101). A generated normal block is stored in the retransmission buffer unit 102 to prepare for retransmission (Step S102). In the transmission control unit 103, an ACK and a NAK for each block received by the control-channel transmitting/receiving unit 109 are managed, and whether a predetermined number N of NAKs are received for blocks, that is, whether the number of blocks waiting for retransmission is equal to or larger than the predetermined number N is determined (Step S103).

Based on the result of this determination, when the number of blocks waiting for retransmission is smaller than the predetermined number N (NO at Step S103), a grouped packet containing a retransmission part does not need to be transmitted yet. Therefore, the transmission control unit 103 instructs the new-part acquiring unit 104 to acquire a normal block. The new-part acquiring unit 104 acquires a normal block generated by the block generating unit 101 (Step S106), and outputs the acquired normal block to the encoding unit 106.

On the other hand, when the number of blocks waiting for retransmission is equal to or larger than the predetermined number N (YES at Step S103), a grouped packet containing a retransmission part needs to be transmitted. Therefore, the transmission control unit 103 instructs the new-part acquiring unit 104 to acquire a part (a new part) of a normal block, and instructs the retransmission-part acquiring unit 105 to acquire a part (a retransmission part) of a block waiting for retransmission. The new-part acquiring unit 104 acquires a part of a normal block generated by the block generating unit 101 as a new part (Step S104), and the retransmission-part acquiring unit 105 acquires a part of already transmitted blocks held in the retransmission buffer unit 102 as a retransmission part (Step S105). The acquired new part and retransmission part are output to the encoding unit 106.

When a normal block or a new part and a retransmission part are output to the encoding unit 106, the encoding unit 106 performs encoding, and generates a packet (Step S107). Specifically, when a normal block is input to the encoding unit 106, a redundant data part containing a CRC and the like to the whole of an information data part, the information data being the normal block, is generated, and a packet containing a new normal block is generated. The packet generated contains only information of one normal block.

When a new part and a retransmission part are input to the encoding unit 106, a redundant data part containing a CRC to the whole of an information data part, the information data being the new part and the retransmission part, is generated, and a packet having grouped the new part and the retransmission part is generated. The packet generated in this way contains information of a part of one normal block and a part of N blocks waiting for retransmission. Because this packet contains not only information of one block waiting for retransmission but is grouped with information of a normal block and other blocks waiting for retransmission, information of one block waiting for retransmission is not excessively retransmitted. As a result, throughput can be improved while reducing wasteful use of resources at a packet retransmission time.

A packet generated by the encoding unit 106 is modulated by the modulating unit 107 (Step S108), and a predetermined wireless transmission process is performed on the packet by the wireless processing unit 108. The packet is then transmitted to the receiving device via the antenna (Step S109). When a packet is generated by the encoding unit 106, whether the generated packet is a grouped packet is notified to the control-channel transmitting/receiving unit 109. The control-channel transmitting/receiving unit 109 transmits a control signal indicating whether the transmitted packet is grouped, simultaneously with transmission of the packet via the control channel.

Figure 6:
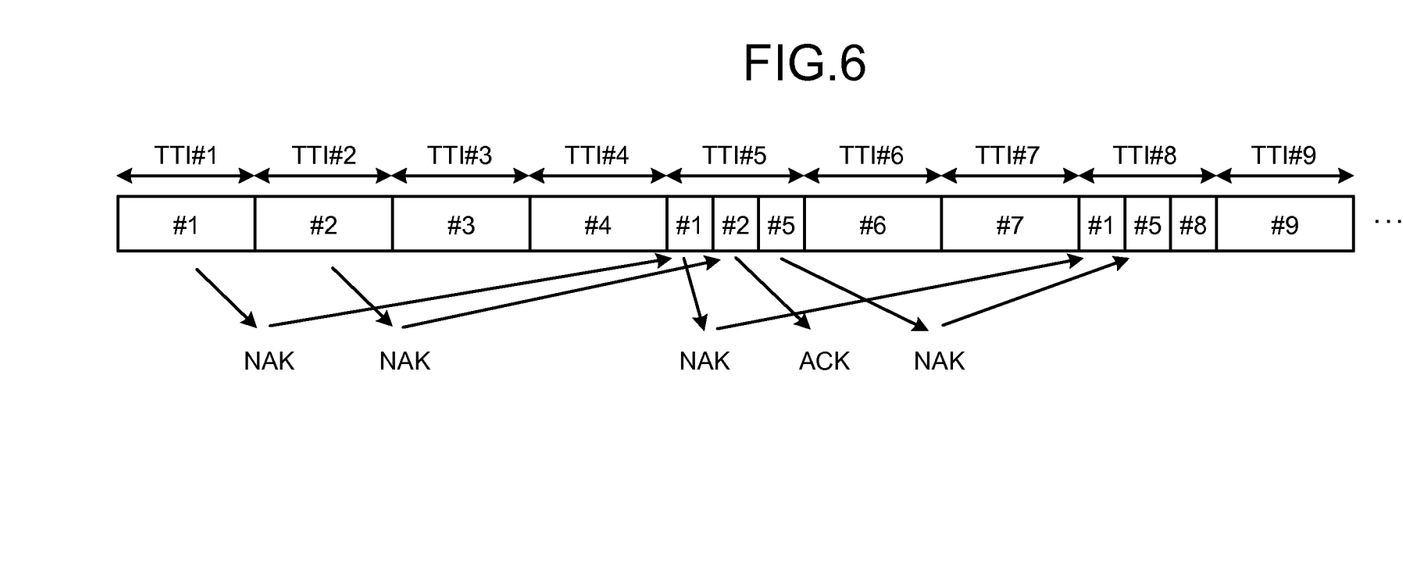
FIG. 6 is an example of a transmission order of a packet according to the embodiment.

When the transmitting device performs the above packet transmission, a packet having grouped a new part and a retransmission part is transmitted each time when the predetermined number N of NAKs are received from the receiving device. For example, a packet is transmitted from the transmitting device in a transmission order as illustrated in FIG. 6. FIG. 6 depicts a state that a grouped packet is transmitted each time when two NAKs are received at TTI (Transmission Time Interval) #1 to TTI #9 of a predetermined length.

That is, for example, when NAKs are received from the receiving device for two packets containing blocks #1 and #2 transmitted at the TTIs #1 and #2, the number of blocks waiting for retransmission becomes two. Therefore, at the TTI #5, a packet having grouped each part of the blocks #1, #2, and #5 is transmitted. In the packet transmitted at the TTI #5, a part of the blocks #1 and #2 corresponds to a retransmission part acquired from a block waiting for retransmission held in the retransmission buffer unit 102, and a part of the block #5 corresponds to a new part acquired from a normal block generated by the block generating unit 101.

Further, at the TTI #5 illustrated in FIG. 6, when a NAK is returned from the receiving device concerning the block #1 and also when a NAK is returned concerning the block #5 although a part of the blocks #1 and #2 is retransmitted, the number of blocks waiting for retransmission becomes two. Therefore, at the TTI #8, a packet having grouped each part of the blocks #1, #5, and #8 is transmitted. In the packet transmitted at the TTI #8, a part of the blocks #1 and #5 corresponds to a retransmission part acquired from a block waiting for retransmission held in the retransmission buffer unit 102, and a part of the block #8 corresponds to a new part acquired from a normal block generated by the block generating unit 101.

By the transmission of a grouped packet at the TTI #5, an ACK is returned concerning the block #2 from the receiving device. This means that concerning the block #2, sufficient error correction is possible by the transmission of a part of the blocks #1 and #5 and a part of the grouped block #2. That is, even when the block #2 transmitted at the TTI #2 needs to be retransmitted, the whole of the block #2 does not need to be retransmitted, and it is sufficient to transmit only a part grouped with a part of a new normal block or other block waiting for retransmission like the retransmission at the TTI #5. In this way, by retransmitting each part of a block necessary for retransmission grouped with a part of other block, energy consumed for the retransmission becomes minimum necessary concerning each block, and wasteful use of resources can be reduced.

When an ACK concerning the block #2 is returned, the block #2 held in the retransmission buffer unit 102 can be discarded. With this arrangement, the capacitance of the retransmission buffer unit 102 can be suppressed to minimum.

Figure 7:
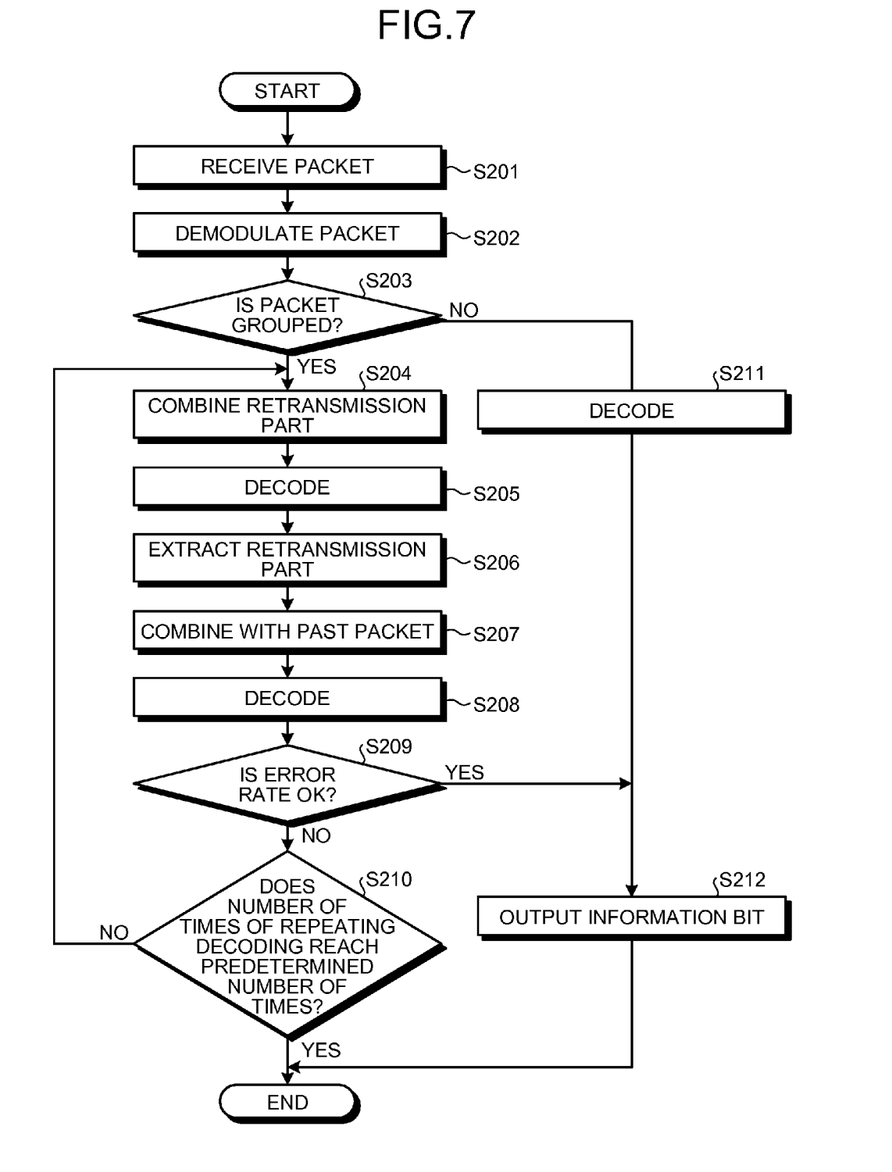
FIG. 7 is a flowchart of an operation of the receiving device according to the embodiment.

FIG. 7 is a flowchart of an operation of the receiving device according to the present embodiment. In FIG. 7, transmission and reception of a control signal via the control channel are omitted, and a process concerning packet reception is illustrated.

When a packet is transmitted from the transmitting device by the above process, this packet is received by the wireless processing unit 201 via the antenna of the receiving device (Step S201). A predetermined wireless reception process is performed on a received packet by the wireless processing unit 201. The processed received packet is demodulated by the demodulating unit 202 (Step S202), and is output to the retransmission-part combining unit 204 and the retransmission-part extracting unit 207. It is assumed that there are two kinds of received packets, including a packet not grouped and containing only one block, and a grouped packet containing a new part and a retransmission part, and that a packet not grouped and containing only a retransmission part is not considered. Whether a received packet has been grouped is notified by a control signal that the control-channel transmitting/receiving unit 210 receives from the control channel.

When the control-channel transmitting/receiving unit 210 receives the control signal, it is determined whether a received packet has been grouped (Step S203). When a received packet has not been grouped (NO at Step S203), this is notified to the retransmission-part combining unit 204. The retransmission-part combining unit 204 directly outputs a received packet containing only one block to both the reception buffer unit 203 and the decoding unit 205. The reception buffer unit 203 holds the received packet. The decoding unit 205 decodes the received packet (Step S211), and the output changeover unit 206 calculates an error rate of a decoded result. As a result, when the error rate is lower than the predetermined threshold value, an information bit of a normal block is output to a processing unit at a later stage (not illustrated) (Step S212). Meanwhile, when the error rate is equal to or higher than the threshold value, it is notified to the control-channel transmitting/receiving unit 210 that retransmission of a block contained in the received block is necessary.

On the other hand, when a received packet has been grouped (YES at Step S203), this is notified to both the retransmission-part combining unit 204 and the retransmission-part extracting unit 207. The retransmission-part combining unit 204 combines a part of a previously received packet corresponding to a retransmission part with a new received packet containing a new part and a retransmission part (Step S204). The decoding unit 205 decodes a combined packet obtained by the combining (Step S205), and a decoded result of a new part is output to the output changeover unit 206. In this case, the decoding unit 205 performs decoding by using not only a redundant data part of a new received packet but also information of a part of a previously received packet. Therefore, an information amount used for the decoding becomes large, and the decoding precision of the total combined packet improves. Consequently, the precision of a decoded result of a new part becomes higher than that when decoding by using only a redundant data part of a received packet.

A decoded result of a new part output to the output changeover unit 206 is output to the retransmission-part extracting unit 207. The retransmission-part extracting unit 207 uses the decoded result of a new part, thereby extracting a retransmission part from a new received part (Step S206). A previously received packet corresponding to an extracted retransmission part is acquired from the reception buffer unit 203, and a retransmission part is combined with the previously received packet (Step S207). The decoding unit 208 decodes a combined packet obtained by the combining (Step S208), and a decoded result of the retransmission part is output to the output changeover unit 209. In this case, the decoding unit 208 decodes a combined packet obtained by combining a retransmission part accurately extracted by using a decoded result of a new part with the previously received packet. Therefore, information used for the decoding becomes accurate, and the decoding precision of the total combined packet improves. Consequently, the precision of a decoded result of a retransmission part becomes higher than that when a retransmission part is extracted from a new received packet following only a control signal and when the extracted retransmission part is combined with a previously received packet, for example.

Figure 8:
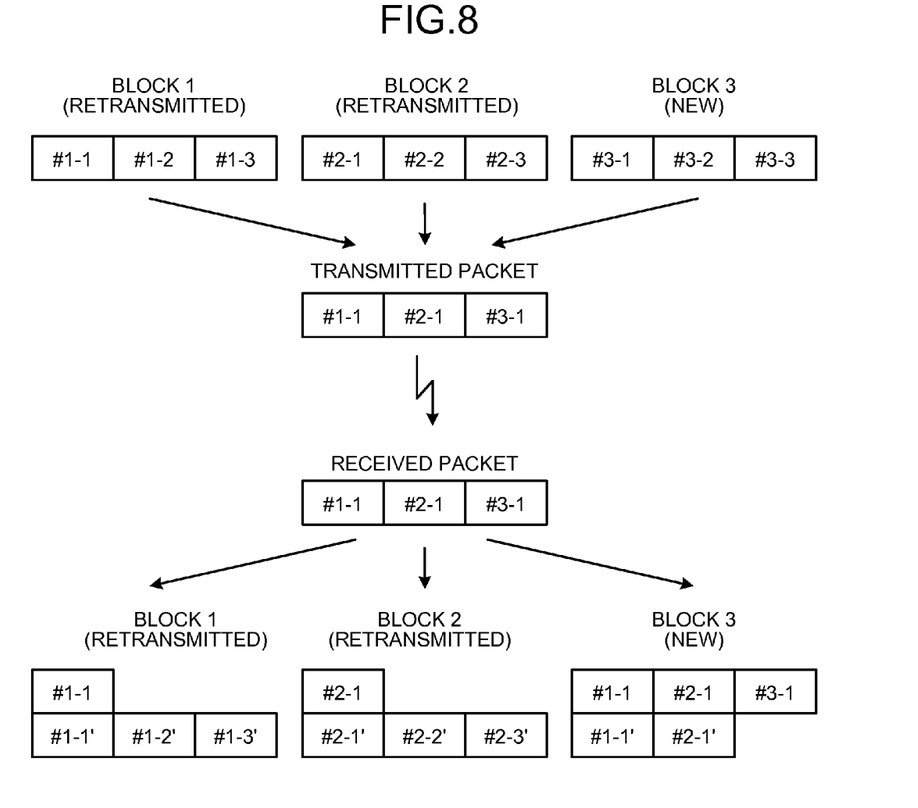
FIG. 8 is an explanatory diagram of combining a retransmission part according to the embodiment.

Combining a retransmission part by the retransmission-part combining unit 204 and the retransmission-part extracting unit 207 is explained based on an example with reference to FIG. 8.

As illustrated in FIG. 8, blocks 1 and 2 are assumed to be waiting for retransmission in the transmitting device because a NAK is returned from the receiving device. In this case, a packet is generated by grouping parts of each of a normal block 3 and the blocks 1 and 2 waiting for retransmission, and the group is transmitted from the transmitting device. It is assumed that a packet having grouped part #1-1 of the block 1, part #2-1 of the block 2, and part #3-1 of the block 3 is transmitted. That is, the packet transmitted from the transmitting device contains the retransmission parts #1-1 and #2-1, and the new part #3-1.

When the receiving device receives the packet, the received packet is input to both the retransmission-part combining unit 204 and the retransmission-part extracting unit 207. In the retransmission-part combining unit 204, parts #1-1' and #2-1' of a previously received packet are acquired from the reception buffer unit 203, and are combined with the retransmission parts #1-1 and #2-1 corresponding to the received packet, respectively. A combined packet obtained in this way corresponds to the normal block 3, and is used to obtain an information bit of a new part. The information bit of the new part is contained in the part #3-1. Therefore, an information amount of the new part does not directly increase by the combining of the parts #1-1' and #2-1'. However, an information amount of the retransmission part increases due to the combining of the parts #1-1' and #2-1' with the retransmission parts #1-1 and #2-1 of the received packet. Therefore, the precision of a decoded result of the total combined packet improves, and the decoding precision of a new part improves as a result.

Meanwhile, the retransmission-part extracting unit 207 uses a decoded result of the new part #3-1, thereby extracting the retransmission parts #1-1 and #2-1 from a received packet and acquiring a previously received packet corresponding to the retransmission parts #1-1 and #2-1 from the reception buffer unit 203. In this case, a received packet containing the block 1 including parts #1-1', #1-2', and #1-3' is acquired as a previously received packet corresponding to the retransmission part #1-1. Further, a received packet containing the block 2 including parts #2-1', #2-2', #2-3' is acquired as a previously received packet corresponding to the retransmission part #2-1.

The retransmission parts #1-1 and #2-1 corresponding to the respective previously received packets are combined. Therefore, the combined packet obtained by combining the retransmission part #1-1 corresponds to the block 1, and the combined packet obtained by combining the retransmission part #2-1 corresponds to the block 2. By decoding these combined packets, an accurate decoded result is obtained for the previously received packets which are required to be retransmitted because an error rate is equal to or higher than the predetermined threshold value. When the retransmission parts #1-1 and #2-1 are extracted from a new received packet, a decoded result of the new part #3-1 is used. Therefore, when the precision of the decoded result of the new part #3-1 is higher, the retransmission parts #1-1 and #2-1 are accurately extracted. That is, when the precision of the decoded result of the new part #3-1 improves by the repetition of decoding, the precision of the retransmission parts #1-1 and #2-1 combined in the previously received packet also improves, and the decoding precision of a combined packet improves.

When a new part and a retransmission part of a received packet are decoded in this way, the output changeover unit 206 and the output changeover unit 209 calculate error rates from the decoded results, respectively, and determine whether each calculated error rate is lower than the predetermined threshold value (Step S209). When an error rate is lower than the predetermined value (YES at Step S209) as a result of the determination, retransmission is not necessary. Therefore, an ACK is transmitted from the control-channel transmitting/receiving unit 210, and an information bit is output to a processing unit at a later stage (not illustrated) (Step S212). That is, when the output changeover unit 206 determines that the error rate is lower than the predetermined threshold value, an information bit corresponding to a new part of the received packet is output. When the output changeover unit 209 determines that the error rate is lower than the predetermined threshold value, an information bit corresponding to a retransmission part of the received packet and a previously received packet is output.

When an error rate of the decoded result is equal to or higher than the threshold value (NO at Step S209), the output changeover unit 206 and the output changeover unit 209 further determine whether the number of times of repeating decoding reaches a predetermined number of times (Step S210). When the number of times of repeating decoding reaches a predetermined number of times (YES at Step S210), an error rate is not lower than the predetermined threshold value even when decoding is repeated at a predetermined number of times. Therefore, an NAK requiring retransmission of a corresponding block is transmitted from the control-channel transmitting/receiving unit 210. That is, when the output changeover unit 206 determines that the number of times of repeating decoding reaches a predetermined number of times, an NAK requiring retransmission of a block corresponding to a new part of the received packet is transmitted from the control-channel transmitting/receiving unit 210. Similarly, when the output changeover unit 209 determines that the number of times of repeating decoding reaches a predetermined number of times, an NAK requiring retransmission of a block corresponding to a retransmission part of the received packet is transmitted from the control-channel transmitting/receiving unit 210. At the same time, repeated decoding is stopped.

On the other hand, when the number of times of repeating decoding does not reach a predetermined number of times (NO at Step S210), decoding of a new part and retransmission part of a received packet is repeated. At the time of performing second and subsequent decoding, the output changeover unit 209 outputs a decoded result of a retransmission part to the retransmission-part combining unit 204. The retransmission-part combining unit 204 combines the decoded result of a retransmission part with the received packet, instead of a part of a previously received packet held in the reception buffer unit 203 (Step S204). Accordingly, at second and subsequent decoding times, more accurate information than that at the last decoding time is combined with a new received packet, and the decoding precision in the decoding unit 205 improves. That is, by repeating decoding of each of the new part and the retransmission part by using respective decoded results, the decoding precision of one of the parts improves when the decoding precision of the other part improves.

Figure 9:
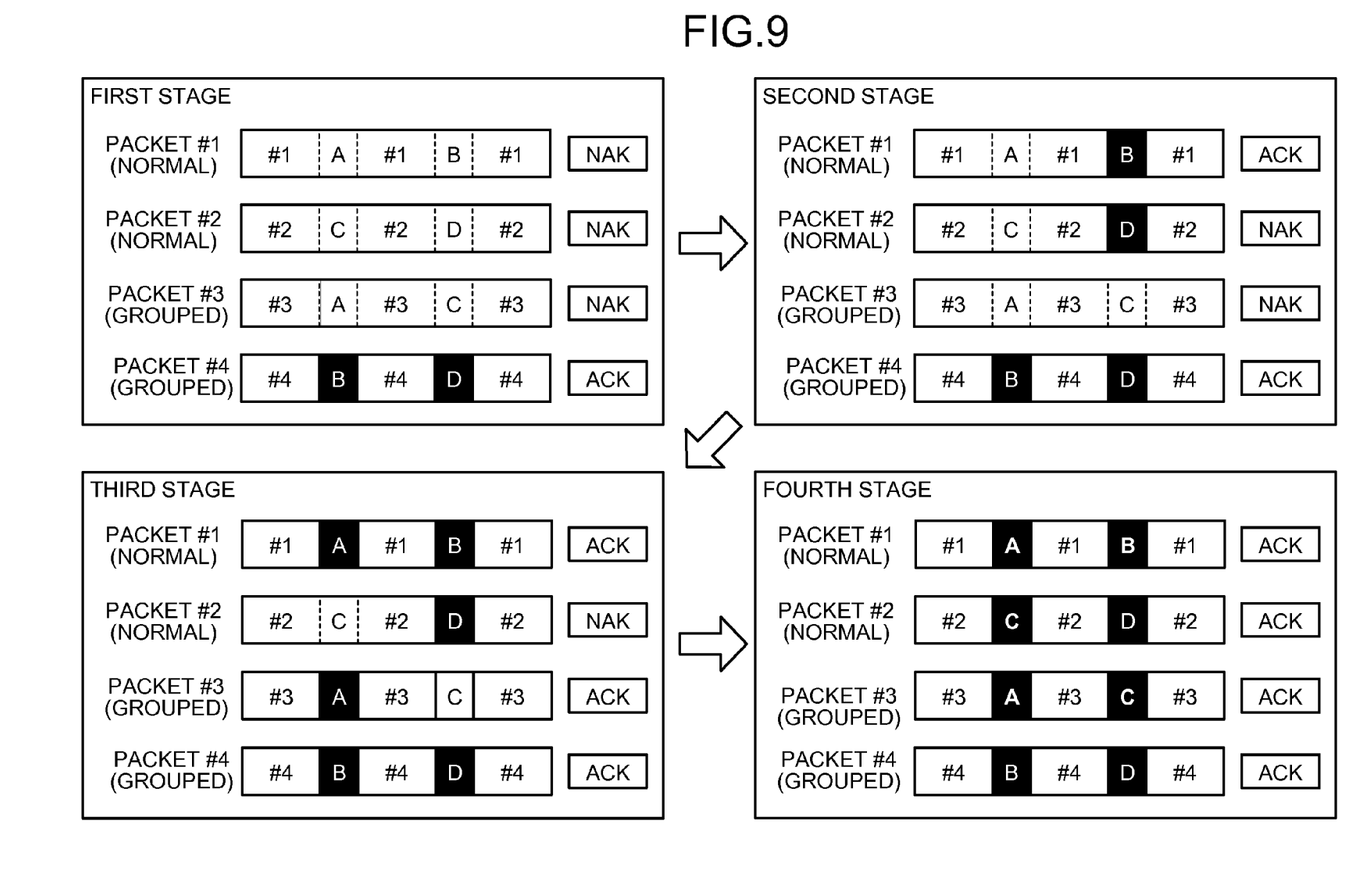
FIG. 9 is an example of repeated decoding according to the embodiment.

FIG. 9 is a detailed example of a state that the decoding precision improves and an error rate is improved by repeated decoding. In FIG. 9, decoding is repeated in the order of a first stage at an upper left side, a second stage at an upper right side, a third stage at a lower left side, and a fourth stage at a lower right side. Packets #1 and #2 are packets containing a normal block, and packet #3 is a grouped packet containing a part of the packets #1 and #2 and is returned because a NAK of the packets #1 and #2 is returned. Packet #4 is a grouped packet containing a part of the packets #1 and #2 transmitted because a NAK is returned even after the packet #3 is transmitted. The packet #3 contains part A of the packet #1 and part C of the packet #2, and the packet #4 contains part B of the packet #1 and part D of the packet #2.

At the first stage, a new part of the packet #4 is accurately decoded as a result of decoding by combining the parts B and D of the packets #1 and #2 with the packet #4. The retransmission parts B and D are extracted from the packet #4 by using a decoded result of the new part. Because the new part of the packet #4 is accurately decoded, the retransmission parts B and D of the packet #4 are extracted in a high precision.

At the second stage, the decoding precision of the past packets #1 and #2 improves as a result of decoding by combining the retransmission parts B and D extracted from the packet #4 with the packets #1 and #2. It is assumed here that an error rate of the packet #1 becomes lower than the predetermined threshold value and that the error rate of the packet #2 is still equal to or higher than the predetermined threshold value.

At the third stage, the part A of the accurate packet #1 is obtained because the error rate of the packet #1 is lower than the predetermined threshold value. A new part of the packet #4 is accurately decoded as a result of decoding by combining the part A of the packet #1 with the retransmission part A of the packet #3. The retransmission parts A and C are extracted from the packet #3 by using a decoded result of the new part. In this case, the retransmission parts A and C of the packet #3 are extracted in a high precision because the new part of the packet #3 is accurately decoded.

At the fourth stage, the decoding precision of the past packet #2 further improves as a result of decoding by combining the reproduction part C extracted from the packet #3 with the packet #2. Accordingly, the error rate of the packet #2 becomes lower than the predetermined threshold value, and the error rates of all the packets #1 to #4 become lower than the predetermined threshold value. Consequently, repeated decoding ends.

As explained above, the mutual decoding precision gradually improves by repeatedly decoding a new part and a reproduction part by using the packets #1 and #2 containing only a normal block and by using the packets #3 and #4 containing the new part and the retransmission part. Finally, the error rates of all packets can be decreased to lower than the predetermined threshold value.

As explained above, according to the present embodiment, when retransmission of a block contained in a packet is required, the transmitting device encodes by grouping a part of the block waiting for retransmission with a part of a new normal block, and transmits an obtained packet. Therefore, regarding the block waiting for retransmission, excessive information is not retransmitted, and transmission of a new normal block is not delayed by retransmission. As a result, throughput can be improved while reducing wasteful use of resources at a packet retransmission time. At the time of decoding a packet having grouped a new part and a retransmission part, the receiving device repeats decoding the other by using one decoded result. As a result, the decoding precision of a new part and a retransmission part gradually improves, and an efficient and accurate decoded result can be obtained.

Figure 10:
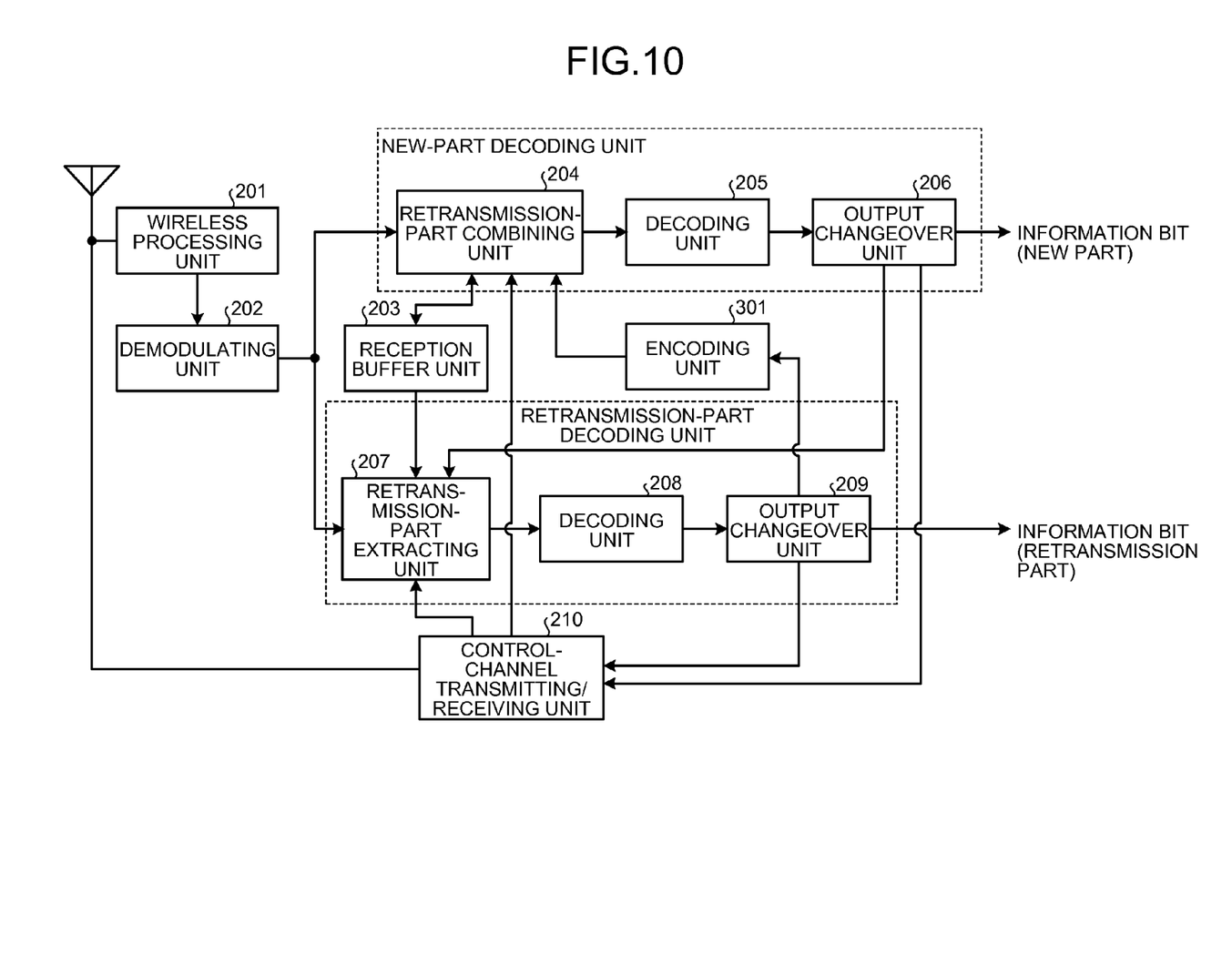
FIG. 10 is a block diagram of a configuration of relevant parts of a receiving device according to another embodiment.

Although a case of performing the CC-HARQ has been explained in the above embodiment, the present invention can be also applied to a case of performing the IR-HARQ. In the case of the IR-HARQ, the configuration of a receiving device becomes as illustrated in FIG. 10. That is, it is a configuration with an encoding unit 301 added to the receiving device illustrated in FIG. 4.

In the case of the IR-HARQ, a different encoding is performed on a retransmission part of a packet at each time of transmission. That is, regarding a new received packet and a previously received packet in the receiving device, different redundant data parts are added to information data part of the same block. Therefore, the encoding unit 301 encodes a decoded result of the retransmission part output from the output changeover unit 209, in a method similar to that of encoding a new received packet. With this arrangement, the retransmission-part combining unit 204 can combine a new received packet with a decoded result of a retransmission part re-encoded by the encoding unit 301.

In the embodiment described above, while an upper limit of the number of times of retransmitting the same block has not been given, it can be arranged that a normal HARQ retransmitting the whole of the block is performed when the number of times of retransmitting the same block reaches a predetermined number of times. That is, when the number of times of retransmitting the same block reaches a predetermined number of times, it can be arranged that the retransmission-part acquiring unit 105 of the transmitting device acquires the whole of a corresponding block from the retransmission buffer unit 102, and the encoding unit 106 encodes the whole block.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encoder comprising:
a controller that determines whether a number of received retransmission requests reaches a predetermined number or not;
an acquiring unit that acquires a new part corresponding to an information bit not yet transmitted and a plurality of retransmission parts each corresponding to an information bit transmitted in past when the controller determines that the number of received retransmission requests is equal to or larger than the predetermined number, and acquires the new part without acquiring the retransmission parts when the controller determines that the number of received retransmission requests is smaller than the predetermined number;
an encoding unit that groups and encodes the new part and the retransmission parts acquired by the acquiring unit; and
a transmitting unit that transmits a packet obtained by encoding by the encoding unit.

2. The encoder according to claim 1, wherein
the acquiring unit includes
a generating unit that generates a block of an information bit of a size capable of being stored in one packet; and
a storage unit that stores therein a block that has been contained in a packet and transmitted among blocks generated by the generating unit, and
the acquiring unit acquires a part of a block newly generated by the generating unit as the new part, and acquires a plurality of parts of at least two blocks stored in the storage unit as the retransmission parts.

3. The encoder according to claim 2, wherein the acquiring unit acquires a plurality of parts of at least two retransmission-waiting blocks for which retransmission is requested among blocks stored in the storage unit as the retransmission parts.

4. The encoder according to claim 3, wherein when a number of retransmission-waiting blocks reaches a predetermined number, the acquiring unit acquires the retransmission parts from each of the retransmission-waiting blocks.

5. The encoder according to claim 1, wherein
the encoding unit encodes only the new part acquired by the acquiring unit when there is no retransmission request from a transmission destination of a packet, and
the encoder further comprises a control-signal transmitting unit that transmits a control signal indicating whether the encoding unit has encoded the new part and the retransmission parts by grouping.

6. The encoder according to claim 2, wherein when a number of retransmitting a same block reaches a predetermined number of times, the encoding unit acquires and encodes whole of the same block from the storage unit.

7. An encoding method comprising:
determining whether a number of receiving retransmission requests reaches a predetermined number of times or not;
acquiring including acquiring a new part corresponding to an information bit not yet transmitted and a plurality of retransmission parts each corresponding to an information bit transmitted in past when the number of receiving retransmission requests is determined to be equal to or larger than the predetermined number of times, and acquiring the new part without acquiring the retransmission parts when the number of receiving retransmission requests is determined to be smaller than the predetermined number of times;
grouping and encoding the new part and the retransmission parts acquired at the acquiring; and
transmitting a packet obtained by encoding at the encoding.

* * * * *